(12) United States Patent
Zhu et al.

(10) Patent No.: US 11,251,500 B2
(45) Date of Patent: Feb. 15, 2022

(54) BATTERY MODULE AND BATTERY PACK

(71) Applicant: Contemporary Amperex Technology Co., Limited, Ningde (CN)

(72) Inventors: Xianchun Zhu, Ningde (CN); Chao Zeng, Ningde (CN); Hua Cao, Ningde (CN); Chong Wang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 4 days.

(21) Appl. No.: 16/970,180

(22) PCT Filed: Sep. 23, 2019

(86) PCT No.: PCT/CN2019/107257
§ 371 (c)(1),
(2) Date: Aug. 14, 2020

(87) PCT Pub. No.: WO2020/220570
PCT Pub. Date: Nov. 5, 2020

(65) Prior Publication Data
US 2021/0242530 A1 Aug. 5, 2021

(30) Foreign Application Priority Data
Apr. 30, 2019 (CN) .......................... 201920615109.4

(51) Int. Cl.
*H01M 50/383* (2021.01)
*H01M 10/42* (2006.01)
(Continued)

(52) U.S. Cl.
CPC ....... *H01M 50/383* (2021.01); *H01M 10/425* (2013.01); *H01M 50/143* (2021.01);
(Continued)

(58) Field of Classification Search
CPC .. H01M 50/383; H01M 10/42; H01M 50/143; H01M 50/176; H01M 50/581;
(Continued)

(56) References Cited

U.S. PATENT DOCUMENTS

| | | | | |
|---|---|---|---|---|
| 2012/0064379 A1* | 3/2012 | Oguri | ................... | H01M 50/325 |
| | | | | 429/56 |
| 2015/0072193 A1* | 3/2015 | Balk | ................... | H01M 50/529 |
| | | | | 429/82 |

FOREIGN PATENT DOCUMENTS

| CN | 105762432 | * | 7/2013 |
|---|---|---|---|
| CN | 104716289 A | | 6/2015 |

(Continued)

OTHER PUBLICATIONS

JP 2017004959MT (Year: 2017).*
(Continued)

*Primary Examiner* — Alexander Usyatinsky
(74) *Attorney, Agent, or Firm* — Law Offices of Liaoteng Wang

(57) ABSTRACT

This disclosure provides a battery module and a battery pack. The battery module includes: a battery set including a plurality of batteries arranged in an array, each of the batteries includes an explosion-proof valve; a cover plate disposed on the battery set; and a thermosensitive assembly disposed between the battery set and the cover plate, the thermosensitive assembly being connected with the cover plate, the thermosensitive assembly including a thermosensitive wire, and thermosensitive wire can provide a prompt signal indicating that the explosion-proof valve of the battery is burst. The battery module according to embodiments of the present disclosure can accurately and effectively transmit the information regarding thermal runaway occurring in the battery to the outside, such that the battery module has a performance of alerting the thermal runaway.

10 Claims, 4 Drawing Sheets

(51) Int. Cl.
*H01M 50/143* (2021.01)
*H01M 50/176* (2021.01)
*H01M 50/581* (2021.01)

(52) U.S. Cl.
CPC ....... *H01M 50/176* (2021.01); *H01M 50/581* (2021.01); *H01M 2010/4271* (2013.01)

(58) Field of Classification Search
CPC ............. H01M 50/519; H01M 10/425; H01M 50/209; H01M 10/48; H01M 50/30; H01M 50/271; H01M 50/287
See application file for complete search history.

(56) References Cited

FOREIGN PATENT DOCUMENTS

| | | | |
|---|---|---|---|
| CN | 105762432 | A | 7/2016 |
| CN | 107946489 | A | 4/2018 |
| CN | 207183388 | U | 4/2018 |
| CN | 108206248 | A | 6/2018 |
| CN | 207800740 | U | 8/2018 |
| CN | 208256867 | U | 12/2018 |
| EP | 3734747 | A1 | 11/2020 |
| EP | 3817085 | A1 | 5/2021 |
| JP | 2009043592 | * | 2/2009 |
| JP | 2014158508 | * | 9/2014 |
| JP | 2014158508 | A | 9/2014 |
| JP | 2014160573 | A | 9/2014 |
| JP | 2014165026 | A | 9/2014 |
| JP | 2017004959 | * | 1/2017 |
| JP | 2017004959 | A | 1/2017 |
| WO | 2017169524 | A1 | 10/2017 |

OTHER PUBLICATIONS

CN 105762432 MT (Year: 2013).*
JP 2009043592 MT (Year: 2009).*
JP2014158508 MT (Year: 2014).*
The International search report for PCT Application No. PCT/CN2019/107257, dated Feb. 1, 2020, 13 pages.
The extended European search report for EP Application No. 19912228.4, dated Sep. 8, 2021, 155 pages.

* cited by examiner

BATTERY MODULE AND BATTERY PACK

CROSS-REFERENCE TO RELATED APPLICATION

This application is a National Stage of International Application No. PCT/CN2019/107257 filed on Sep. 23, 2019, which claims the priority of the Chinese patent application No. 201920615109.4, entitled "BATTERY MODULE AND BATTERY PACK" and filed on Apr. 30, 2019, both of which are incorporated herein by reference in their entireties.

TECHNICAL FIELD

The present disclosure relates to the field of batteries, and in particular, to a battery module and a battery pack.

BACKGROUND

As the energy density in power batteries and energy storage batteries is getting higher and higher, the requirements for battery safety are becoming higher and higher. In the battery module, a thermal runaway will occur when a battery is abused, which may rapidly generate high temperature and fire flame having extremely strong destructive power, thereby easily causing serious accidents.

In the existing module design schemes of power batteries and energy storage batteries, the sampling of batteries only collects to transmit the voltage and temperature signals of some batteries, and cannot effectively and accurately provide and transfer a prompt signal indicating the thermal runaway to outside.

SUMMARY

The present disclosure provides a battery module and a battery pack, which can provide a prompt signal of thermal runaway in a battery.

In one aspect, an embodiment of the present disclosure provides a battery module including: a battery set including a plurality of batteries arranged in an array, each of the batteries including an explosion-proof valve; a cover plate disposed on the battery set; and a thermosensitive assembly disposed between the battery set and the cover plate, the thermosensitive assembly being connected with the cover plate, the thermosensitive assembly including a thermosensitive wire, and the thermosensitive wire can provide a prompt signal indicating that the explosion-proof valve of the battery is burst.

According to an aspect of the embodiment of the present disclosure, the thermosensitive wire is configured to be disconnected when the explosion-proof valve of the battery is burst, so as to provide the prompt signal.

According to an aspect of the embodiment of the present disclosure, the thermosensitive assembly further includes a covering, the covering is connected with the cover plate, a receiving cavity is provided inside the covering, and at least one part of the thermosensitive wire is disposed in the receiving cavity.

According to an aspect of the embodiment of the present disclosure, the covering includes a first covering layer, and a surface of the first covering layer facing the cover plate is provided with a receiving groove, to form at least one part of the receiving cavity.

According to an aspect of the embodiment of the present disclosure, the covering further includes a second covering layer, and the second covering layer and the first covering layer are laminated on each other, such that the receiving groove is at least partially enclosed to form the receiving cavity.

According to an aspect of the embodiment of the present disclosure, the covering includes a first surface facing the cover plate, and the first surface is connected with the cover plate by using thermocompression or adhesive bonding or adsorption.

According to an aspect of the embodiment of the present disclosure, the covering is connected with the cover plate through a connecting member.

According to an aspect of the embodiment of the present disclosure, the covering includes a first surface facing the cover plate and a second surface facing away from the cover plate, the covering further includes a connecting hole penetrating the first surface and the second surface, and the connecting member is inserted into the connecting hole to detachably connect the covering and the cover plate.

According to an aspect of the embodiment of the present disclosure, the covering extends along a first direction, and the covering comprises two opposite end surfaces in the first direction, the thermosensitive wire includes an input terminal and an output terminal, the thermosensitive wire has a U-shaped structure, and the input terminal and the output terminal of the thermosensitive wire protrude from one of the two end surfaces of the covering.

According to an aspect of the embodiment of the present disclosure, the thermosensitive assembly further includes an electrical connector, and the input terminal and the output terminal of the thermosensitive wire are connected with the electrical connector.

According to an aspect of the embodiment of the present disclosure, two or more thermosensitive wires are received in the receiving cavity of each covering.

According to an aspect of the embodiment of the present disclosure, the plurality of batteries in the battery set are arranged in at least one row, such that the explosion-proof valves in each row of the batteries are colinearity arranged; at least one thermosensitive assembly is provided on a side of each row of the batteries where the explosion-proof valves are provided, wherein a projection of the thermosensitive wire of each thermosensitive assembly on a plane where the explosion-proof valves of the plurality of batteries in the battery set are located passes through the explosion-proof valves of a corresponding row of the batteries.

On the other hand, an embodiment of the present disclosure provides a battery pack including the battery module according to any one of the foregoing embodiments; and a battery management system module, the thermosensitive wire of the thermal module of the battery module being electrically connected with the battery management system module.

The battery module according to the embodiment of the present disclosure, includes the cover plate disposed on the battery set and the thermosensitive assembly disposed between the battery set and the cover plate. The thermosensitive assembly includes a thermosensitive wire, in some embodiments, the thermosensitive wire may be connected with the battery management system. When the thermal runaway occurs in the battery, the explosion-proof valve is burst to heat up the thermosensitive assembly, and a portion of the thermosensitive wire which is heated is turned into a molten state, thereby the connection is disconnected or melted, an open-circuit or short-circuit signal is formed, and the open-circuit signal or the short-circuit signal as a prompt signal can accurately and effectively transmit the information regarding the thermal runaway occurring in the battery to the outside, such that the battery module has a performance of alerting the thermal runaway in use. In addition, when the thermal runaway occurs in the battery, the cover plate has certain fire protection and heat insulation capabilities, the cover plate can prevent the fire flame caused by the thermal runaway in the battery from spreading rapidly outside the battery module. Therefore, in conjunction with its performance of alerting the thermal runaway, the safety of the battery module in use is improved.

In some alternative embodiments, the thermosensitive wire is configured to be disconnected when the explosion-proof valve of the battery is burst. When the thermal runaway occurs in the battery, the explosion-proof valve is burst to heat up the thermosensitive assembly, and a portion of the thermosensitive wire which is heated is turned into a molten state and is adsorbed as spherical break points towards both sides, such that the circuit formed by thermosensitive wire will be turned from being originally connected into being open. The open-circuit signal may be used as a prompt signal, to quickly transmit the information regarding the thermal runaway occurring in the battery to the outside.

BRIEF DESCRIPTION OF THE DRAWINGS

In the following, other features, objects, and advantages of the present disclosure will become more apparent by reading the detailed description of non-limiting embodiments with reference to the accompanying drawings, in which the identical or similar features are denoted by the same or similar reference numerals.

Figure 1:
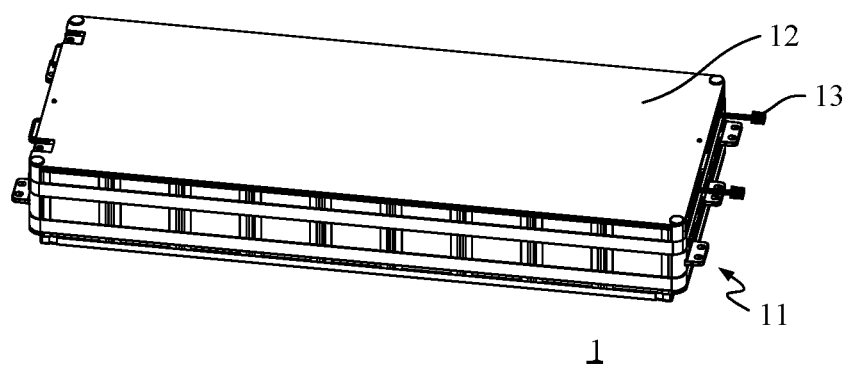
FIG. 1 shows a perspective view of a battery module according to a first embodiment of the present disclosure.

In the drawings:
- 1—battery module;
- 11—battery set; 111—battery; 1111—explosion-proof valve; 1112—electrode;
- 12—cover plate; 121—cover plate connecting member;
- 13—thermosensitive assembly;
- 131—thermosensitive wire; 131*a*—input terminal; 131*b*—output terminal;
- 132—covering; 132*a*—first surface; 132*b*—second surface; 132*c*—end surface; 1321—first covering layer; 1321*s*—receiving groove; 1322—second covering layer;
- 13*h*—connecting hole;
- 134—electrical connector;
- 14—wiring harness isolation plate; 141—electrode opening;
- 15—busbar;
- 16—circuit board; 161—body; 162—sampling terminal;
- 19—connecting member;
- X—first direction.

DETAILED DESCRIPTION

Features and exemplary embodiments in various aspects of the present disclosure will be described in detail below. In order to make the object, technical solution, and advantage of the present disclosure more explicit, the present disclosure will be described in further detail, with reference to the drawings in conjunction with specific embodiments. It should be understood that, the specific embodiments described herein are only configured to illustrate the present disclosure, and are not configured to limit the present disclosure. For those skilled in the art, the present disclosure may be practiced without some of these specific details. The following description of the embodiments is merely to provide a better understanding of the present disclosure by illustrating examples of the present disclosure.

It should be stated that relational terms herein such as first, second, and the like are only used to distinguish one entity or operation from another entity or operation, and it is not necessarily required or implied that any such actual relationship or order exists between these entities or operations. Moreover, the terms "including", "comprising", or any other variation thereof are intended to encompass non-exclusive inclusion, such that a process, method, article, or device including a series of elements includes not only these elements, but also those elements not explicitly listed, or those elements which are inherent to such the process, method, article, or device. Without more restrictions, the elements defined by the term "including . . . " do not exclude other identical elements existing in the process, method, article, or equipment including said elements.

It should be appreciated that, when the structure of a component is described, one layer or region being disposed "on" or "above" another layer or region may mean that the one layer or region is directly disposed on the another layer or region, or that other additional layer(s) or region(s) are included between the one layer or region and the another layer or region. If the component is flipped, the one layer or region will be disposed "under" or "below" the another layer or region.

The embodiments of the present disclosure provide a battery module and a battery pack. The battery pack may include the battery module and a battery management system module (Battery Management System, BMS). The BMS is used to manage the battery module and its internal batteries, and detect the working status of the battery module and its internal batteries.

The battery module according to some alternative embodiments of the present disclosure will be described in detail below with reference to the accompanying drawings.

Figure 2:
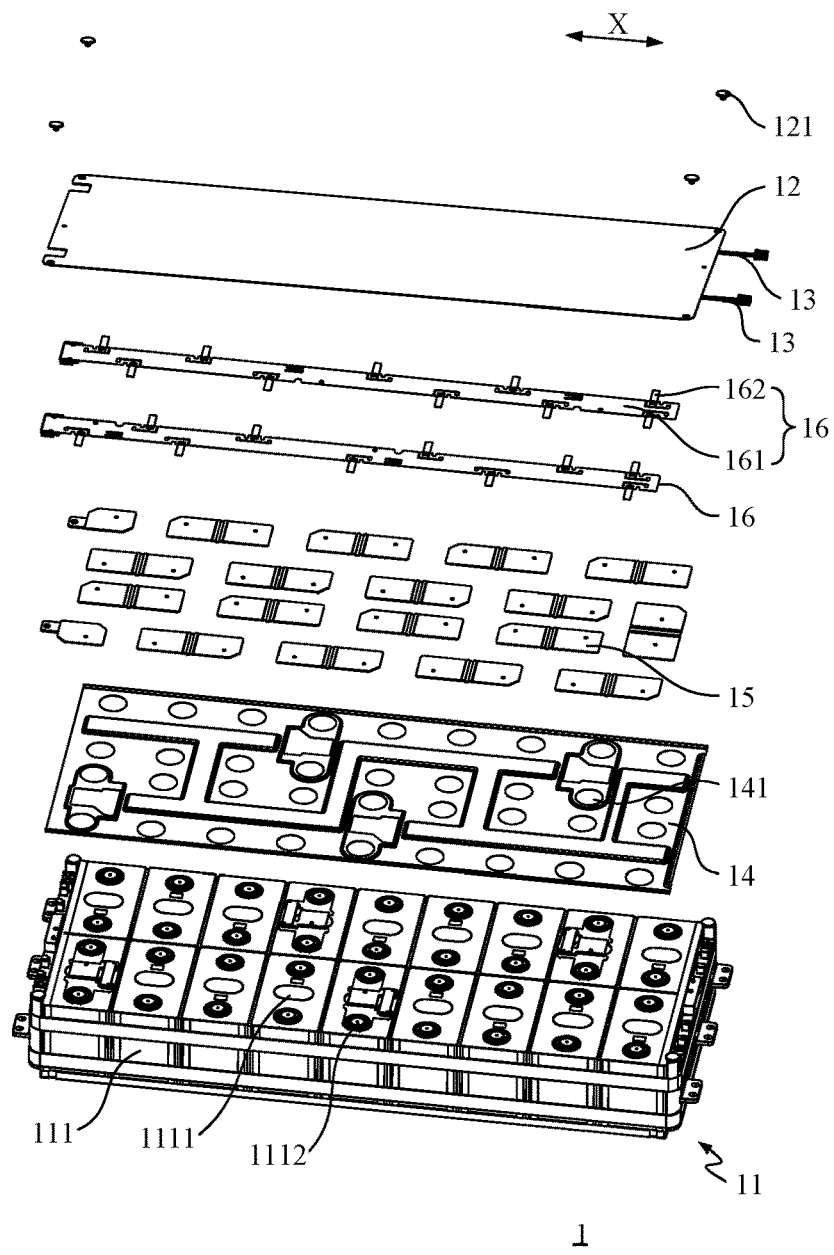
FIG. 2 shows an exploded perspective view of a battery module according to a first embodiment of the present disclosure.

FIGS. 1 and 2 respectively show a perspective view and an exploded perspective view of a battery module according to a first embodiment of the present disclosure. The battery module 1 may include a battery set 11, a cover plate 12, and the like. In some embodiments, the battery module 1 may further include a wiring harness isolation plate 14, a busbar 15, a circuit board 16, and the like. Moreover, in this embodiment, the battery module 1 further includes a thermosensitive assembly 13, and the thermosensitive assembly 13 is used for providing a prompt when a thermal runaway occurs in the batteries.

The battery set 11 includes a plurality of batteries 111 arranged in an array. Each battery 111 includes an explosion-proof valve 1111 and an electrode 1112. The battery 111 may be a square-shaped battery having a top cover assembly, and the explosion-proof valve 1111 and the electrode 1112 may be disposed on the top cover assembly. The plurality of batteries 111 may be arranged in at least one row. In this embodiment, for ease of description, the plurality of batteries 111 are arranged in two rows as an example. In each row, the plurality of batteries 111 are stacked in a thickness direction.

The wiring harness isolation plate 14 is disposed on the battery set 11, and is used for installing component such as the circuit board 16 and for isolating the component such as the circuit board 16 from the battery set 11. In some embodiments, the wiring harness isolation plate 14 is provided with a plurality of electrode openings 141, such that the electrodes 1112 of the plurality of batteries 111 in the battery set 11 are exposed at the electrode openings 141.

The circuit board 16 may be installed on the wiring harness isolation plate 14. The circuit board 16 includes a body 161 and a plurality of sampling terminals 162. The sampling terminal 162 is connected with the battery 111, and can collect electrical parameters and/or temperature parameters of the battery 111. In some embodiments, the circuit board 16 may be a flexible printed circuit (Flexible Printed Circuit, FPC), and the sampling terminal 162 may protrude outward from the body 161, to facilitate connection with the battery 111. The number of the circuit board 16 may be one, or may be two or more. In some embodiments, a single circuit board 16 is correspondingly disposed on one side of each row of the batteries 111 where the electrodes 1112 are provided.

The circuit board 16 may be electrically connected with the BMS of the battery pack. For example, the circuit board 16 collects voltage signal and temperature signal of the batteries 111 and transfers the voltage signal and the temperature signal to the BMS.

In some embodiments, the sampling terminal 162 may be connected with the electrode 1112 of the battery 111. In this embodiment, the battery module 1 further includes a busbar 15, which is connected with the electrode 1112 of the battery 111. The sampling terminal 162 of the circuit board 16 is connected with the battery 111 through the busbar 15.

It can be appreciated that the above fixture and/or installation manner of the circuit board 16 in the battery module 1 and the above electrical connection manner of the circuit board 16 and the batteries 111 are illustrated as examples. In some other embodiments, the circuit board 16 is not limited to being installed and fixed in the battery module 1 through the wiring harness isolation plate 14, and the sampling terminal 162 of the circuit board 16 is not limited to be electrically connected with the battery 111 through the busbar 15. The installation manner and electrical connection manner may be adjusted according to the design of the structure of module.

The cover plate 12 is disposed on the battery set 11. In this embodiment, the cover plate 12 is disposed on the circuit board 16. In some embodiments, the cover plate 12 may be connected with the battery set 11 and/or the wiring harness isolation plate 14 through a cover plate connecting member 121, such as a snap connecting member.

The cover plate 12 may be made of mica, which has certain fire protection and heat insulation performance and therefore can slow down the spread of fire flame when the thermal runaway occurs in the batteries 111.

Figure 3:
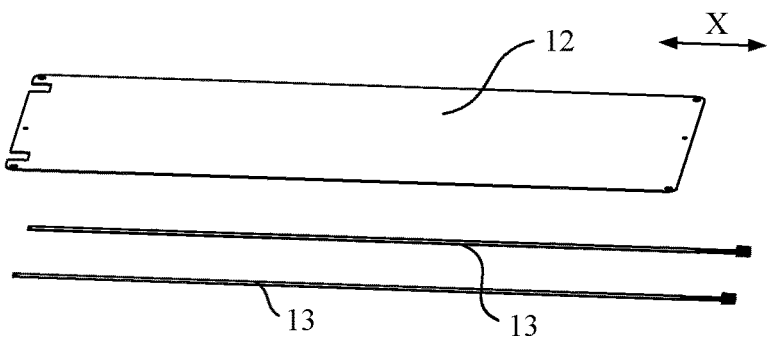
FIG. 3 shows an exploded perspective view of a cover plate and a thermosensitive assembly according to a first embodiment of the present disclosure.

FIG. 3 shows an exploded perspective view of the cover plate and the thermosensitive assembly according to the first embodiment of the present disclosure. The thermosensitive assembly 13 in this embodiment is located between the battery set 11 and the cover plate 12, and the thermosensitive assembly 13 is connected with the cover plate 12. In some embodiments, the thermosensitive assembly 13 is connected with a surface of the cover plate 12 facing the battery set 11. The number of the thermosensitive assembly 13 connected with the cover plate 12 may be one, or may be two or more.

Figure 4:
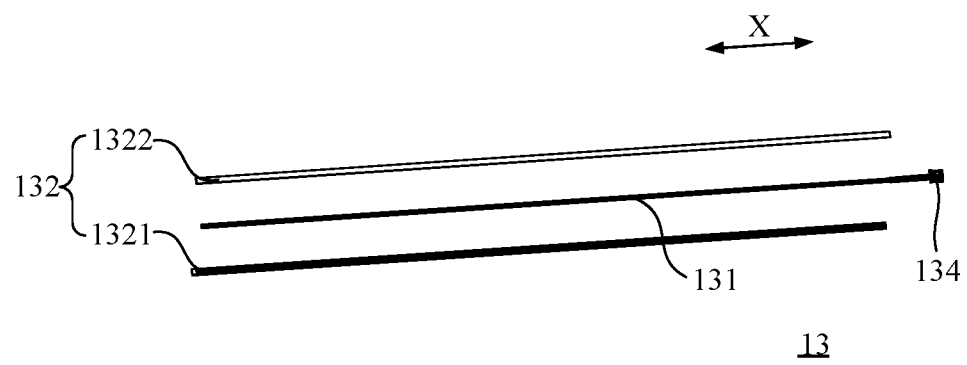
FIGS. 4 and 5 show an exploded perspective view of a thermosensitive assembly according to a first embodiment of the present disclosure.
Figure 5:
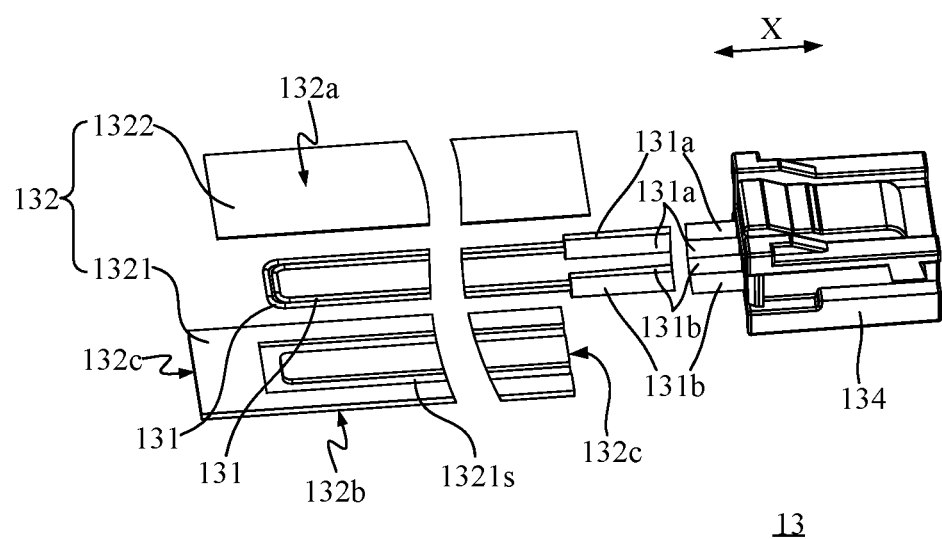

FIGS. 4 and 5 respectively show an exploded perspective view of the thermosensitive assembly according to the first embodiment of the present disclosure. The thermosensitive assembly 13 includes a thermosensitive wire 131, which can provide a prompt signal indicating that the explosion-proof valve 1111 of the battery 111 is burst.

During the use of the battery module 1, the thermal runaway phenomenon may occur in the battery 111 included in the battery module 1 in some situations. When the thermal runaway occurs, the explosion-proof valve 1111 of the battery 111 is burst. Herein, the burst of the explosion-proof valve 1111 means that, when the thermal runaway occurs, the explosion-proof valve 1111 is opened to eject high-temperature gas, high-temperature electrolyte, sparks, or the like and thus release a large amount of heat above and around the explosion-proof valve 1111. It may be determined whether the thermal runaway phenomenon occurs in the battery 111 by detecting whether a burst phenomenon occurs in the corresponding explosion-proof valve 1111.

The battery module 1 according to the embodiment of the present disclosure includes the cover plate 12 disposed on the battery set 11 and the thermosensitive assembly 13 disposed between the battery set 11 and the cover plate 12, and the thermosensitive assembly 13 includes the thermosensitive wire 131. When the thermal runaway occurs in the battery 111, the explosion-proof valve 1111 is burst to heat up the thermosensitive assembly 13, and a portion of the thermosensitive wire 131 which is heated is turned into a molten state, thereby the connection is disconnected or melted, an open-circuit or short-circuit signal is formed, and the open-circuit signal or short-circuit signal as a prompt signal can accurately and effectively transmit the information regarding the thermal runaway occurring in the battery 111 to the outside, such that the battery module 1 has a performance of alerting the thermal runaway in use.

In addition, when the thermal runaway occurs in the battery 111, due to certain fire protection and heat insulation capabilities, the cover plate 12 can prevent the fire flame caused by the thermal runaway in the battery 111 from spreading rapidly outside the battery module 1. Therefore, in conjunction with its performance of alerting the thermal runaway, the safety of the battery module 1 in use is improved.

In the battery pack including the battery module according to the embodiments of the present disclosure, the thermosensitive assembly 13 may be electrically connected with the BMS, i.e., the thermosensitive wire 131 of the thermosensitive assembly 13 is electrically connected with the BMS. When the battery 111 is in a normal working condition without thermal runaway, the BMS detects a signal indicating that the circuit of the thermosensitive wire 131 is connected in the normal working condition. When the thermal runaway occurs in the battery 111, the explosion-proof valve 1111 thereof is burst to heat up the thermosensitive wire 131, such that the thermosensitive wire 131 may quickly sense a signal of change in temperature. When the temperature exceeds a set threshold, the portion of the thermosensitive wire 131 which is heated is turned into a molten state, such that the circuit is shorted or opened. The short-circuit or open-circuit signal can be transferred to the BMS as a prompt signal to accurately and effectively transmit the information regarding the thermal runaway occurring in the battery 111 to the outside. Therefore, the safety of battery module in use is improved.

In some embodiments, the battery module 1 and the battery pack are applied to a vehicle as a power source. When the thermal runaway occurs in the battery 111, the thermosensitive wire 131 provides and transfers a prompt signal to the BMS, and the BMS can quickly send an alarm signal to the vehicle system, so that there is enough time for people in the vehicle to keep away from the vehicle, injuries to the people in the vehicle caused by the burning phenomenon generated by thermal runaway of the battery is prevented. Therefore, the reliability and safety of battery module and battery pack in applications are improved.

In each of the batteries 111 according to this embodiment, the explosion-proof valve 1111 is disposed in the top cover assembly, in particular a central region thereof. In some embodiments, the plurality of batteries 111 in the battery set 11 are arranged in at least one row, such that the explosion-proof valves 1111 in each row of the batteries 111 are colinearity arranged. At least one thermosensitive assembly 13 is provided on one side of each row of the batteries 111 where the explosion-proof valves 1111 are provided. A projection of the thermosensitive wire 131 of each thermosensitive assembly 13 on the plane where the explosion-proof valves 1111 of the plurality of batteries 111 of the battery set 11 are located passes through the explosion-proof valves 1111 of the corresponding row of the batteries 111.

In this embodiment, a single thermosensitive assembly 13 is correspondingly disposed on each row of the batteries 111 (that is, on the side of each row of the batteries 111 where the explosion-proof valves 1111 are provided), and the projection of the thermosensitive wire 131 of the thermosensitive assembly 13 on the above-mentioned plane where the explosion-proof valves 1111 are located passes through the explosion-proof valves 1111 of the corresponding row of the batteries 111. In the battery module 1 according to this embodiment, when the explosion-proof valve 1111 of any of at least one battery 111 is abnormal and burst, the thermosensitive assembly 13 can be quickly heated up, such that the thermosensitive wire 131 of the thermosensitive assembly 13 can quickly provide the above-mentioned prompt signal.

In this embodiment, the thermosensitive wire 131 may be a stannum wire, and in some embodiments, a stannum wire containing a rosin flux. The thermosensitive wire 131 includes an input terminal 131a and an output terminal 131b. In some embodiments, the input terminal 131a and output terminal 131b of the thermosensitive wire 131 are both connected with the BMS. Under normal working conditions, the BMS detects that the circuit of the thermosensitive wire 131 is connected. When the thermal runaway occurs in the battery 111 and the explosion-proof valve thereof 1111 is burst, the stannum wire in the region above the explosion-proof valve 1111 will sense high temperature, will immediately become into a molten state, will be disconnected by being adsorbed as spherical points towards both sides, and thus the circuit of thermosensitive wire 131 will be turned from being connected into being open. The open-circuit signal may be used as a prompt signal to quickly transmit the information regarding the thermal runaway occurring in the battery 111 to the outside (for example, BMS).

As shown in FIGS. 4 and 5, in some embodiments, the thermosensitive assembly 13 further includes a covering 132, which is connected with the cover plate 12. A receiving cavity may be provided inside the covering 132, and at least one part of the thermosensitive wire 131 is disposed within the receiving cavity. The covering 132 receives the thermosensitive wire 131 and connects with the cover plate 12, so that the integration of the thermosensitive wire 131 and the cover plate 12 can be realized.

In some embodiments, the covering 132 includes a first covering layer 1321, which may be made of an insulating material such as mica and polyamide-6 (Polyamide-6, PA6). The surface of the first covering layer 1321 facing the cover plate 12 is provided with a receiving groove 1321s, and the receiving groove 1321s forms at least one part of the receiving cavity. In some embodiments, the receiving groove 1321s is shaped to match the winding shape of the thermosensitive wire 131. The first covering layer 1321 may be directly or indirectly connected with the cover plate 12.

In some embodiments, the covering 132 further includes a second covering layer 1322, which may be made of an insulating material such as mica and polyamide-6 (Polyamide-6, PA6). The second covering layer 1322 and the first covering layer 1321 are laminated on each other so as to at least partially enclose the receiving groove 1321s to form the receiving cavity. In this embodiment, the covering 132 may be connected with the cover plate 12 through the second covering layer 1322, and the thermosensitive wire 131 is at least partially received in the receiving cavity enclosed by the second covering layer 1322 and the first covering layer 1321, so that the integration of the thermosensitive wire 131 and the cover plate 12 is achieved.

In this embodiment, the covering 132 includes a first surface 132a facing the cover plate 12, and the first surface 132a is connected with the cover plate 12 by using thermocompression or adhesive bonding or adsorption, such that the covering 132 and the cover plate 12 are integrated.

The covering 132 extends along a first direction X. In some embodiments, the first direction X is parallel to the stacking direction of each row of the batteries 111. The covering 132 includes two opposite end surfaces 132c in the first direction X. The thermosensitive wire 131 includes the input terminal 131a and the output terminal 131b. The thermosensitive wire 131 in this embodiment has a U-shaped structure, and the input terminal 131a and the output terminal 131b of the thermosensitive wire 131 protrude from one of the two end surfaces 132c of the covering 132.

In some embodiments, the thermosensitive assembly 13 further includes an electrical connector 134, and the input terminal 131a and the output terminal 131b of each thermosensitive wire 131 are connected with the electrical connector 134, so as to facilitate the electrical connection between the thermosensitive wire 131 and the system such as BMS.

In some embodiments, two or more thermosensitive wires 131 are received in the receiving cavity of the covering 132. For example, in this embodiment, two thermosensitive wires 131 are received in the receiving cavity of each covering 132, wherein the two thermosensitive wires 131 extend in a U-shaped structure and the receiving groove 1321s in the first covering layer 1321 also extend in the U-shaped structure, so that two thermosensitive wires 131 are simultaneously received. By providing two or more thermosensitive wires 131 in the receiving cavity of each covering 132, it is possible to effectively improve the accuracy of detecting the burst phenomenon of the explosion-proof valve 1111, thereby effectively reducing the occurrence of false alarms and reducing parts per million (Parts per million, PPM) of false alarms.

In the above battery module 1 according to the first embodiment of the present disclosure, the thermosensitive assembly 13 is connected with the cover plate 12 by using thermocompression or adhesive bonding or adsorption via its covering 132, such that the thermosensitive assembly 13 and the cover plate 12 are integrated. However, the integrated connection manner of the thermosensitive assembly 13 and the cover plate 12 may not be limited to thereto.

Figure 6:
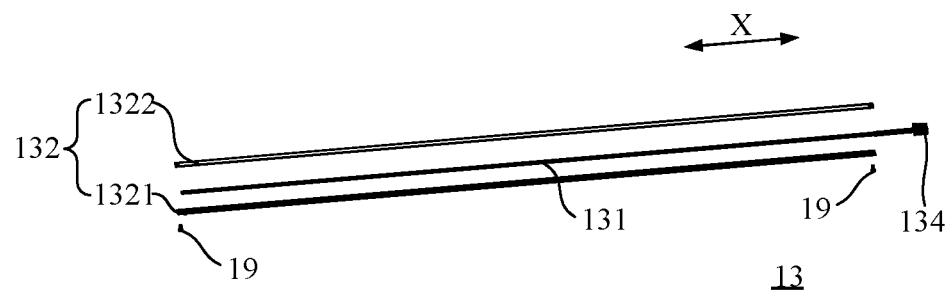
FIGS. 6 and 7 shows an exploded perspective view of a thermosensitive assembly according to a second embodiment of the present disclosure.
Figure 7:
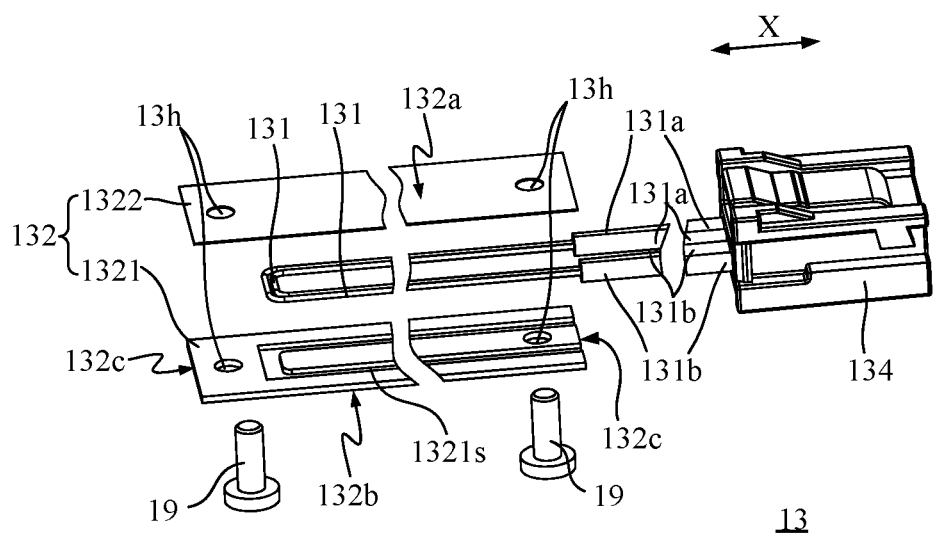

FIGS. 6 and 7 respectively show exploded perspective views of a thermosensitive assembly according to a second embodiment of the present disclosure. The structure of the thermosensitive assembly 13 according to the second embodiment is mostly similar to that of the thermosensitive assembly 13 according to the first embodiment, so the description thereof is omitted here. The present embodiment differs from the first embodiment in that the thermosensitive assembly 13 includes a covering 132 which is connected with the cover plate 12 through a connecting member 19. The connecting member 19 is, for example, a bolt connecting member, so as to realize the detachable integration of the thermosensitive assembly 13 and the cover plate 12.

Further, the covering 132 includes a first surface 132a facing the cover plate 12 and a second surface 132b facing away from the cover plate 12. The covering 132 is further provided with a connecting hole 13h penetrating the first surface 132a and the second surface 132b. The connecting member 19 is inserted into the connecting hole 13h to detachably connect the covering 132 with the cover plate 12.

The number of connecting holes 13h provided in the covering 132 may be adjusted according to actual requirements. In some embodiments, two connecting holes 13h are provided in the covering 132, and the two connecting holes 13h are respectively disposed at two ends of the covering 132 in the first X direction. In some embodiments, the connecting hole 13h is disposed away from the receiving cavity, so as to avoid interference of the connecting member 19 on the thermosensitive wire 131 in the receiving cavity.

In the battery module 1 according to the embodiments of the present disclosure and the battery pack including the battery module 1, in some embodiments, different integration schemes may be selected according to the actual structure of the battery module 1 to realize integration between the thermosensitive assembly 13 and the cover plate 12 to provide a prompt signal indicating thermal runaway occurring in the battery 111. At the same time, the introduction and integration of the thermosensitive assembly 13 does not conflict with other structures inside the battery module 1, so that there is no need to design additional structures in the battery module 1 except the cover plate 12. Therefore, the original production procedure of battery module 1 can be largely guaranteed.

Meantime, a modular integration design is formed between the thermosensitive assembly 13 and the cover plate 12, and the standard modular design can achieve better production versatility and assembly consistency, and ensure the operability of different design schemes. Because of the standardization and modularity, the design cost of battery module products is reduced, the production efficiency of a single product is accelerated, and thus the cost of materials can be effectively reduced.

According to the embodiments of the present disclosure as described above, these embodiments neither describe elaborately all the details, nor limit the disclosure to the specific embodiments described. Obviously, many modifications and changes may be made according to the above description. In this specification, these embodiments are selected and described specifically in order to better explain the principles and practical applications of the present disclosure, so that those skilled in the art can make good use of the present disclosure and modifications based on the present disclosure. The present disclosure is limited only by the claims and its comprehensive scope and equivalents.

What is claimed is:

1. A battery module, comprising:
   a battery set comprising a plurality of batteries arranged in an array, each of the batteries comprising an explosion-proof valve;
   a cover plate disposed on the battery set; and
   a thermosensitive assembly disposed between the battery set and the cover plate, the thermosensitive assembly being mechanically connected with the cover plate, the thermosensitive assembly comprising a thermosensitive wire, and the thermosensitive wire can provide a prompt signal indicating that the explosion-proof valve of the battery is burst,
   wherein the thermosensitive assembly further comprises a covering, the covering is connected with the cover plate, a receiving cavity is provided inside the covering, and at least one part of the thermosensitive wire is disposed in the receiving cavity,
   wherein the covering is connected with the cover plate through a connecting member, and
   wherein the covering comprises a first surface facing the cover plate and a second surface facing away from the cover plate, the covering is further provided with a connecting hole penetrating the first surface and the second surface, and the connecting member is inserted into the connecting hole to detachably connect the covering and the cover plate.

2. The battery module according to claim 1, wherein the thermosensitive wire is configured to be disconnected when the explosion-proof valve of the battery is burst, so as to provide the prompt signal.

3. The battery module according to claim 1, wherein the covering comprises a first covering layer, and a surface of the first covering layer facing the cover plate is provided with a receiving groove, to form at least one part of the receiving cavity.

4. The battery module according to claim 3, wherein the covering further comprises a second covering layer, and the second covering layer and the first covering layer are laminated on each other, such that the receiving groove is at least partially enclosed to form the receiving cavity.

5. The battery module according to claim 1, wherein the covering comprises a first surface facing the cover plate, and the first surface is connected with the cover plate by using thermocompression or adhesive bonding or adsorption.

6. The battery module according to claim 1, wherein the covering extends along a first direction, the covering comprises two opposite end surfaces in the first direction, the thermosensitive wire comprises an input terminal and an output terminal, the thermosensitive wire has a U-shaped structure, and the input terminal and the output terminal of the thermosensitive wire protrude from one of the two end surfaces of the covering.

7. The battery module according to claim 6, wherein the thermosensitive assembly further comprises an electrical connector, and the input terminal and the output terminal of the thermosensitive wire are connected with the electrical connector.

8. The battery module according to claim 1, wherein two or more thermosensitive wires are received in the receiving cavity of each covering.

9. The battery module according to claim 1, wherein the plurality of batteries in the battery set are arranged in at least one row, such that the explosion-proof valves in each row of the batteries are colinearity arranged; and at least one thermosensitive assembly is provided on a side of each row of the batteries where the explosion-proof valves are provided, wherein a projection of the thermosensitive wire of each thermosensitive assembly on a plane where the explosion-proof valves of the plurality of batteries in the battery set are located passes through the explosion-proof valves of a corresponding row of the batteries.

10. A battery pack, comprising:

the battery module according to claim 1; and a battery management system module, the thermosensitive wire of the thermosensitive assembly of the battery module being electrically connected with the battery management system module.

* * * * *